United States Patent Office 3,510,244
Patented May 5, 1970

3,510,244
DYEING CELLULOSIC FIBERS OR BLENDS THEREOF WITH A CHLORO-PYRIMIDYL REACTIVE DYE AND A RESIN BONDED PIGMENT IN A HYDROXYETHYLCELLULOSE - ETHYL ACRYLATE - METHYLMENTHACRYLATE COPOLYMER OR BUTADIENE STYRENE COPOLYMER DISPERSION
Eric A. Schlaginhaufen, Mahwah, and Andrew W. Goodwin, Woodcliff Lake, N.J., assignors to Geigy Chemical Corporation, Ardsley, N.Y., a corporation of New York
No Drawing. Continuation-in-part of application Ser. No. 319,672, Oct. 29, 1963. This application Jan. 31, 1967, Ser. No. 612,825
Int. Cl. D06p 1/76
U.S. Cl. 8—62        1 Claim

ABSTRACT OF THE DISCLOSURE

Blended fabrics made of blends of cellulose and polyester fibers are printed with a printing paste composition comprising a color concentrate containing a fiber reactive dyestuff, a resin-bonded pigment and hydroxyethylcellulose, carboxyethylcelluose or an etherified starch as a thickening agent, and an extender comprising water, alkali and the same type of thickening agent as in the color concentrate.

CROSS REFERENCES TO RELATED APPLICATIONS

This application is a continuation-in-part application of application Ser. No. 319,672, filed Oct. 29, 1963, and now abandoned.

BACKGROUND OF THE INVENTION

This invention relates to compositions suitable for printing fabrics, especially blended fabrics, as well as to a process utilizing such compositions. More particularly, the instant invention pertains to improved print paste compositions useful for printing synthetic and cellulosic fiber blended fabrics and to an improvement in the printing of such blended fabrics which consists of the use of such improved print paste compositions.

In recent years, an ever-increasing volume of fabrics consisting of blends of synthetic fibers with cellulosic fibers have been brought onto the United States textile market. However, printing of such blended fabrics has been problematic. Special procedures and/or print paste formulations were heretofore required to obtain printing of a fabric made up of a blend of hydrophobic synthetic fiber with the hydrophilic cellulosic fiber. Still, union appearance of coloration on the two dissimilar fibers in the fabric cannot be achieved in all shades readily and economically by the practice of prior art procedures.

Notable among the practices heretofore employed in the art for printing such two-fiber blends were those which utilized print paste formulations containing resin bonded pigments or resin bonded pigments in combination with disperse dyes, or disperse dyes in combination with either reactive dyes or vat dyes.

At the present time, high-quality performance of pigment printing on, e.g., polyester/cellulose fabrics, particularly with respect to durability of the print in washing and drycleaning, can be achieved only in pastel and light shades. In other words, light to medium shades are the maximum depth which will give acceptable performance in apparel applications. Also, since pigments are bonded by polymeric materials to the surface of the fiber, a change in the hand and a reduction in the water absorbency of the fabric are obvious further disadvantages.

The alternate approach of printing by means of a combination of resin bonded pigments and disperse dyes or a combination of disperse dyes and either reactive or vat dyes is likewise disadvantageous. At least thermofixing and, with a large number of disperse dyes, also steaming or flash aging is necessary to achieve fixation and this involves relatively high temperatures and steam, results in complicated procedures and requires complex apparatus which is not universally available in printing establishments. Furthermore, disperse dyes are tinctorially not very strong which requires larger amounts thereof, are difficult to fix due to their tendency to sublime at the high temperatures used and tend to stain the non-printed part of the fabric. Where thermofixing alone is used in printing with a combination of disperse dyes and reactive dyes a notable disadvantage is loss in color value, due in part to the inter-action of alkali with disperse dyes and incomplete fixation of the reactive dyes during thermal fixation. Therefore, a two-step fixation which entails thermofixing and padding and flash-aging is generally employed. Thus, the use of disperse dyes with reactive dyes, the best combination heretofore known in the art for printing two-fiber blended fabrics, falls considerably short of the desideratum of a simple printing technique which avoids high temperatures, dispenses with complicated apparatus and yields prints on blended fabrics with union appearance of coloration in all shades.

Practice of the present invention will achieve this desideratum and overcome the disadvantages attendant to the prior art practices described above. It is an object of this invention to provide for a print paste composition which is easy to prepare, is stable for a long period of time, and can readily be used and adjusted for shade. It is another object of this invention to provide for a print paste composition which avoids the use of disperse dyes and the colorants of which are very easy to fix without the use of relatively high temperatures and complicated procedures and apparatus. It is a further object of this invention to provide for a simplified procedure of printing two-fiber blended fabrics by means of such an improved print paste formulation, the printed fabrics being characterized by fine appearance and hand, fastness to washing and drycleaning and solidity and smoothness of shade as well as reproducibility. Other objects and advantages of the invention will become obvious from the following description.

SUMMARY OF THE INVENTION

It has now been found that by incorporating in a print paste formulation pigments in combination with reactive dyestuffs together with a selected swelling or thickening agent, such as, hydroxyethylcellulose, the above mentioned objects can unexpectedly and surprisingly be accomplished.

More specifically, the invention product-wise is in its broadest aspect that of a print paste formulation or composition particularly suited for printing blended fabrics which consist of the following components:

(A) A color paste or concentrate comprising as essential ingredients
    (1) a fiber-reactive dyestuff
    (2) a resin-bonded pigment
    (3) a selected swelling or thickening agent
    (4) at least one binder
    (5) a dispersing or emulsifying agent
    (6) mineral spirits and
    (7) water
(B) A reduction paste or printing extender comprising
    (1) an extender concentric consisting essentially of
        (a) a selected swelling or thickening agent
        (b) a dispersing or emulsifying agent and
    (2) other ingredients as follows:
        (a) an humectant or polar compound
        (b) an alkaline substance
        (c) mineral spirits
        (d) water the ratio of color concentrate to printing extender being in the range of 1:2 to 1:1000 and preferably 1:3 to 1:00

In its narrower aspects, the instant invention is that of the above-mentioned color paste, reduction paste and extender concentrate, individually and separately as subcombinations.

Process-wise the invention is that of the method of printing synthetic and cellulostic fiber blended fabrics which method comprises treating such fabrics with the print paste composition mentioned above and set forth in greater detail below and drying the fabrics thus treated.

DESCRIPTION OF THE INVENTION

The invention, in both of its composition and method aspects, is applicable to the printing of blends of synthetic fibers, such as polyester (e.g. Fortrel), acrylics, modified acrylics, acetate, triacetate, polypropylester, nylon, etc., and cellulosic fibers, such as, rayon (e.g. Avril), cotton, linen, wool, silk, or combinations thereof. The present invention is particularly applicable to and is exemplified below by printing of Dacron/cotton, Fortrel/Avril and Fortrel/cotton fiber blends, the latter made into fabrics known as batiste, broadcloth and voile. As the description of this invention proceeds it will, however, become obvious that, for instance, straight cotton fabrics can likewise be printed accordingly to great advantage.

The color paste or concentrate (component A) of the print paste composition comprises as one ingredient a fiber-reactive dye. The amount of reactive dye used will depend on the tinctorial value desired and on the dispersibility of color; it can range in the present color concentrate from about 2 to 24, and preferably from about 4 to 16, parts by weight of the total color concentrate. Any of the well-known classes of reactive dyestuffs, that is, dyestuffs that have both chromophoric and reactive functional groups, can be employed in accordance with the present inventive concept.

Examples of commercially available dyestuffs which may be used in this color concentrate include:

C.I. Reactive Yellow 11 (produced according to Example 3 of U.S. Pat. 3,342,789)

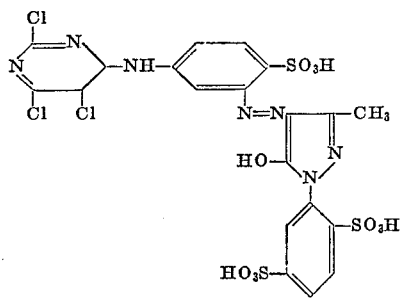

C.I. Reactive Blue 18 (Example 4 of the above patent)

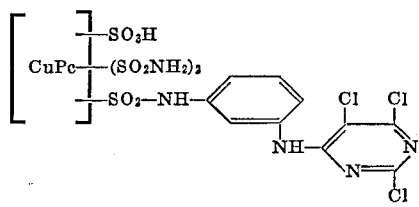

C.I. Reactive Red 17 (produced as No. 8 of Table II in the above patent)

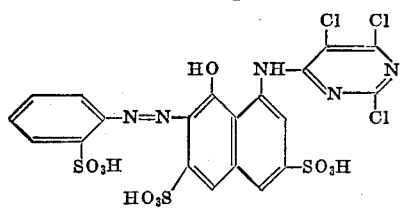

C.I. Reactive Orange 16

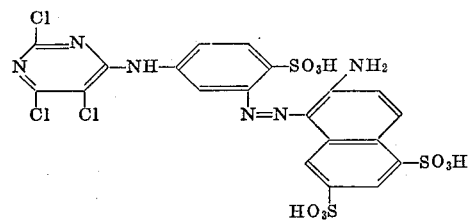

C.I. Reactive Blue 17

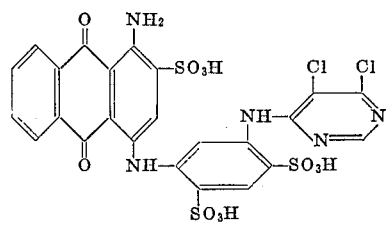

C.I. Reactive Violet 3

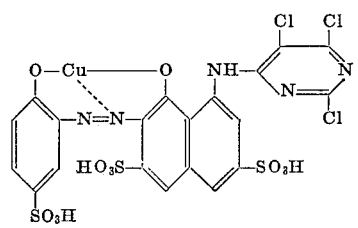

C.I. Reactive Red 19 (Example 5 of the above patent)

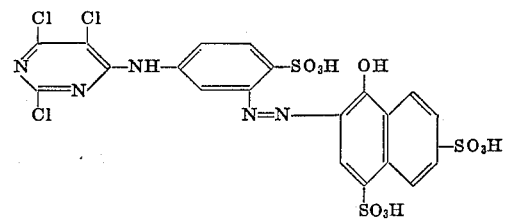

C.I. Reactive Yellow 12

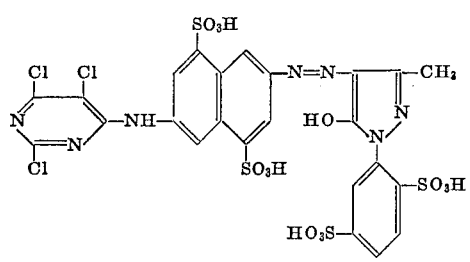

C.I. Reactive Blue 10

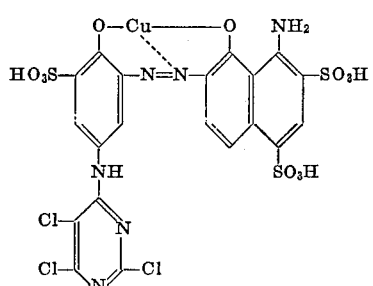

C.I. Reactive Red 20
(No. 5 in Table 1 of the above patent)

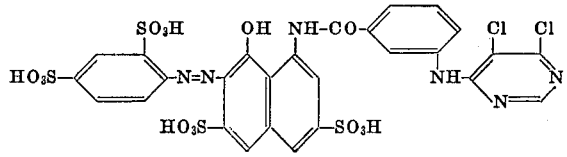

C.I. Reactive Black 4

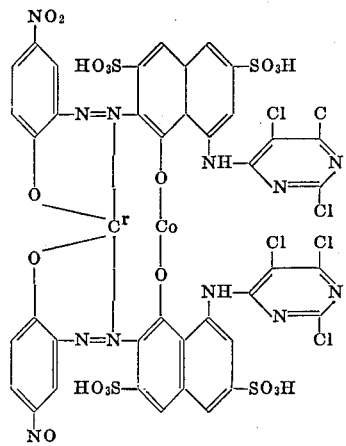

While the foregoing reactive dyestuffs all have pyrimidine chloride as the reactive functional groups, any of all of the reactive dyestuffs known to the art may be employed in the practice of this invention. Other reactive functional groups which are commonly employed are cyanuric chloride, vinyl sulfone, acrylamide or substituted amine.

Another essential ingredient of the color concentrate is a resin-bonded pigment, which can constitute from between about 5 to 50, and preferably 15 to 25, parts by weight of the total color concentrate. Any of the pigments which are commercially available can be incorporated in the color concentrate. Typical examples of resin-bonded pigments employed are:

Pigment Blue 15, Color Index No. 74160

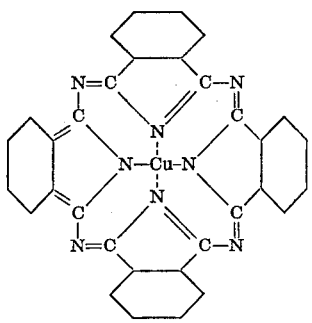

Available as Tinolite Fast Blue GL 5012.

Pigment Green 7, Color Index No. 74260

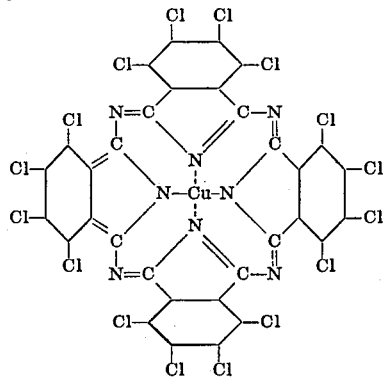

Pigment Yellow 14, Color Index No. 21110

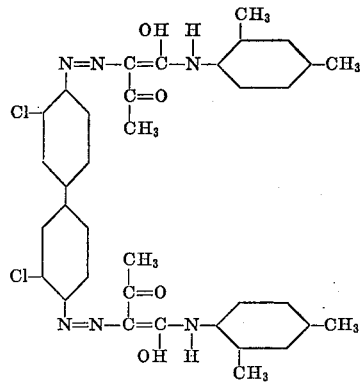

Available as Tinolite Yellow 4G 1042.

Pigment Red 17, Color Index No. 12490

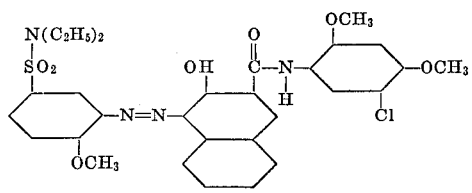

Available as Tinolite Red BX3002.

A third essential ingredient of the color concentrate is a selected water-soluble swelling or thickening agent, of which there can be present therein from about 0.2 to 2, and preferably from about 0.5 to 1, parts by weight of the total color concentrate. While there are many thickening agents that are commercially available and used in conventional print pastes, it has now surprisingly and unexpectedly been found that in the practice of this invention only hydroxyethylcellulose, carboxyethylcellulose, and etherified starches (U.S.P. Re. 23,443) are operative. Particularly preferred is hydroxyethylcellulose for, as will be shown below, in printing with print pastes containing hydroxyethylcellulose no special curing procedure is required.

Further ingredients in the color concentrate are the following:

(1) At least 10 to 40, and preferably 16 to 30, parts by weight of a binder or preferably a binder system consisting preferably of
    (a) about 50 parts by weight of a copolymer of butadiene and styrene, their respective ratio being about: 40:60 percent and
    (b) about 50 parts by weight of a copolymer of ethyl acrylate and methyl methacrylate, their respective ratio being about 60:40 percent, which binder system offers adequate crock protection without impairment of hand;

(2) 0.2 to 5, and preferably 0.4 to 1, parts by weight of a dispersing or emulsifying agent, such as, polyoxyethylene oleate, ethylene oxide condensate, etc.

(3) 0.4 to 20, and preferably 5 to 15, parts by weight of mineral spirits or petroleum distillate or other equivalent hydrocarbon solvents and (4) water q.s. as vehicle bring the total to 100 parts by weight.

Equivalents of the ingredients listed above such as would be obvious to those skilled in the art may be substituted.

It is also contemplated to use in this color concentrate still further additives, where desired, such as, anti-foam and sequestering agents and others obvious to those skilled in the art of up to 1 and preferably between 0.1 to 0.5 part by weight.

The color concentrate can be produced as follows: The reactive dyestuff is completely dissolved in water, the HEC prewet with the dispersant is added and this mixture is blended at high speed till it is swollen. Then the mineral spirits are emulsified in this mixture and the pigment is incorporated therein. Finally, the binder or binder system is blended into this color concentrate.

The printing extender (component B) of the print paste composition is prepared by thoroughly mixing together (1) 1 to 5, and preferably 2 to 4 parts by weight of the total printing extender of an extender concentrate consisting essentially of about 25 to 75, and preferably about 62.5 parts by weight of the extender concentrate of the swelling agent used in the color concentrate, that is, HEC, which is preferred, or carboxymethylcellulose or etherified starches, and about 25 to 75, and preferably about 37.5 parts by weight of the extender concentrate of a dispersing or emulsifying agent, such as polyethylene oleate, ethylene oxide condensate etc. which is also present in the color concentrate, and (2) such other conventional ingredients of printing extenders as an humectant or polar compound, such as urea, which is preferred, or thiourea, or pentaerythritol or polyethylene glycols, constituting 5 to 30, and preferably 15 to 25, parts by weight of the printing extender; an alkaline substance to catalyze the chemical combination of the dye and fiber in the fixing process, such as, sodium or potassium hydroxide or carbonate or bicarbonate, the choice of such alkaline substance being largely dependent on the type of reactive dyestuff used—constituting about 1 to 5, and preferably 1 to 3, parts by weight of the printing extender; 1 to 50, and preferably 20 to 40 parts by weight of the printing extender of mineral spirits; and water q.s. to furnish the remainder of the printing extender totaling 100 parts by weight.

The printing extender likewise can contain further additives, such as, an oxidizing agent or a reserve salt exemplified by sodium m-nitrobenzene sulfonate of up to 2, and preferably 0.5 to 1, part by weight to protect the dyes from reduction; anti-foam and sequestering agents of up to 1, and preferably 0.1 to 0.5 part by weight; print lubricants, e.g., pine, mineral or motor oil of up to 2, and preferably 0.5 to 1.5, parts by weight, as well as still further additives known in the art, where desired.

As mentioned above the ratio in the print paste composition of color concentrate to printing extender can range between 1:2 to 1:1000 and preferably 1:3 to 1:100. Using the latter preferred proportions, the following total concentrations of constituents of the paste can be produced:

| | Parts |
|---|---|
| Chloropyrimidyl reactive dye | 12 |
| Pigment | 20 |
| Binder comprising about equal parts of (a) a copolymer of butadiene and styrene, the ratio of butadiene and styrene being 40:60, and (b) a copolymer of ethylacrylate and methylmethacrylate the ratio of ethylacrylate to methyl methacrylate being 60:40 | 20 |
| Hydroxyethylcellulose | 188–626 |
| Humectant | 15–3000 |
| Alkaline substance | 3–15 |
| Mineral spirits | 13–160 |

The above-described print paste composition is then in accordance with the process aspect of this invention applied to synthetic and cellulosic fiber blended fabrics which have been prepared for printing by a series of such conventional procedures as desizing, scouring, (mercerizing), (heat setting), singeing, bleaching and/or drying. The printing of such fabrics by applying thereto the subject print paste composition can be carried out in such printing equipment as hand-screen or automatic-screen printing machines or high-speed roller printing machines, depending on the yardage of printed fabrics desired and the facilities available. Where a screen-printing machine is utilized, the fabric to be printed is placed onto a non-absorbent blanket which has been coated with an adhesive to prevent any shifting of the fabric and screens carrying print paste compositions in the colors desired are sequentially superimposed on the fabric. With roller printing machines, the fabric is laid out on absorbent fabric which moves on a continuous non-absorbent blanket past printing rollers which carry the printing pastes.

Immediately after leaving the printing machine, the fabric proceeds into a dryer to achieve fixation of the colorants. More specifically, the drying of the fabric can be accomplished by way of can-drying involving a steam-filled cylinder or flue-drying involving hot air, gas, electricity or infra-red light. This drying procedure involving temperatures ranging between about 220 and 300° F. and lasting only for from about 30 seconds to about 2 to 3 minutes, is entirely sufficient to complete the fixation of the colorants on the fiber. There is no further need for special curing at temperatures exceeding 300° F. or even thermofixing at temperatures generally above 400° F. and possibly also padding and flash aging. In fact, if hydroxyethylcellulose is used as the swelling or thickening agent in the color concentrate as well as in the extender it has surprisingly been found that the elevated temperatures which accompany the normal printing procedure are sufficient to accomplish fixation of the colorants on the fiber to a satisfactory degree. In certain instances, steaming or aging can be utilized.

After drying, the printed fabrics are soaped and finished in the presence of a fixing agent, an amine condensate (condensation product of formaldehyde and dicyandiamide) in accordance with well-known standard procedures.

Although the reaction mechanism is not fully understood, it appears as though the reactive dyestuff combines with the swelling agent to form a new compound that is even more reactive by virtue of the hydroxy groups of the swelling agent. Furthermore, in the printing with a combination of pigments and reactive dyestuffs, it appears that a uniform base is provided by the pigment on the blended fabric by way of adhesion and that the reactive dyestuff apparently bonded with the swelling agent, can then build on the pigment base to provide the balance of the shade.

The composition and the process of this invention will be illustrated in greater detail by the following representative but non-limitative example:

EXAMPLE

| Color concentrate: | Parts by wt. |
|---|---|
| Reactone Turquoise FGL dye (C.I. Reactive Blue 18) | 12.0 |
| Water | 37.0 |
| Carboxyethylcellulose | 0.5 |
| Fatty acid ester of higher polyglycol | 0.5 |
| Mineral spirits | 10.0 |
| Binder (butadiene-styrene copolymer) | 10.0 |
| Binder (ethyl acrylate-methyl methacrylate copolymer) | 10.0 |
| Pigment Green 7, Color Index No. 74260 | 20.0 |
| | 100.0 |

This color concentrate was made as follows:

The Reactone dye was dispersed in water with minimum of dusting. When the solution was free from specks, the swelling agent prewet with the emulsifier was added and mixed at high speed until swollen. The mineral spirits were emulsified in this mixture and the pigment was incorporated. Finally the binders were blended in.

Printing extender:                                    Parts by wt.
  Hot water _____  46
  Soda ash _____   2
  Reserve salt _____   1
  Urea _____  25
  Extender concentrate (mixture of a fatty acid ester
    of higher polyglycol emulsifier 37.5 parts, and
    carboxyethylcellulose 62.5 parts) _____   4
  Mineral spirits _____  22
                                                   ———
                                                   100

The printing extender was made by adding the ingredients to hot water in the order listed above.

The print paste composition was prepared before the printing operation by mixing the color concentrate and the printing extender in ratios of 1/3, 1/19 and 1/99.

This print paste composition was then used in printing a 65/35 Dacron/cotton and Fortrel/Avril fabric on a roller printing machine. From the printing machine, the printed fabric was placed immediately on dry cans where it was dried at 300° F. for three minutes. It was then rinsed in cold water for three minutes, in 160° F. water for three minutes, in 160° F. water containing ¼% Calgon and ¼% flake soap for three minutes, in cold water containing 0.5% of an amine condensate (condensation product of formaldehyde and dicyandiamide). It was finally dried and ironed.

Following the teaching of the above example, blended fabrics were printed employing print paste compositions containing C.I. Reactive Blue 10 (Reactone Navy Blue 2RL) and Pigment Blue 15, C.I. No. 74160 (Tinolite Fast Blue GL 5012); and C.I. Reactive Yellow 11 (Reactone Brilliant Yellow 5 GL) and Pigment Yellow 14, C.I. No. 21100 (Tinolite Yellow 4G 1042); C.I. Reactive Red 20 (Reactone Brilliant Red BGL) and Pigment Red 17, C.I. No. 12490 (Tinolite Red BX 3002), etc.

What is claimed is:

1. A method of printing fabrics consisting of cellulosic fibers and cellulosic and synthetic fiber blends which comprises, applying to said fabric a print paste composition comprising an aqueous mixture of:

|  | Parts |
|---|---|
| Chloropyrimidyl reactive dye | 12 |
| Pigment | 20 |
| Binder comprising about equal parts of (a) a copolymer of butadiene and styrene, the ratio of butadiene and styrene being 40:60, and (b) a copolymer of ethylacrylate and methylmethacrylate, the ratio of ethylacrylate to methylmethacrylate being 60:40 | 20 |
| Hydroxyethylcellulose | 188–626 |
| Humectant | 15–3000 |
| Alkaline substance | 3–15 |
| Mineral spirits | 13–160 |

References Cited

UNITED STATES PATENTS

| 2,459,108 | 1/1949 | Lolkema | 260—233.3 |
| 3,097,960 | 7/1963 | Lawton | 117—38 |
| 3,246,946 | 4/1966 | Gardon | 8—116.3 |

OTHER REFERENCES

Fortess et al.: American Dyestuff Reporter, May 27, 1963, pages 402–411.

Schlaeppi: American Dyestuff Reporter, June 2, 1958, pages 377–383.

Saville: American Dyestuff Reporter, Mar. 5, 1962, pages 160–164.

AATC Technical Manual, 1963 edition, page E–165, pub. 1963 by the AATC, New York, N.Y.

DONALD LEVY, Primary Examiner

U.S. Cl. X.R.

8—17, 21, 22, 24, 63, 91, 92, 94; 117—139

PO-1050
(5/69)

UNITED STATES PATENT OFFICE
CERTIFICATE OF CORRECTION

Patent No. 3,510,244         Dated   July 7, 1970

Inventor(s) Eric A. Schlaginhaufen and Andrew W. Goodwin

It is certified that error appears in the above-identified patent and that said Letters Patent are hereby corrected as shown below:

In column 3, line 42, U.S.Pat. 3,342,789 should be U.S.Pat. 3,342,798 --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents